United States Patent [19]

Stournas

[11] 4,216,097
[45] Aug. 5, 1980

[54] WATERFLOODING EMPLOYING AMPHOTERIC SURFACTANTS

[75] Inventor: Stamoulis Stournas, Flemington, N.J.

[73] Assignee: Mobil Oil Corporation, New York, N.Y.

[21] Appl. No.: 815,740

[22] Filed: Jul. 15, 1977

[51] Int. Cl.$^2$ ............................................. E21B 43/22
[52] U.S. Cl. ............................... 252/8.55 D; 166/274; 166/275
[58] Field of Search .................. 252/8.55 D; 166/273, 166/274, 275

[56] References Cited

U.S. PATENT DOCUMENTS

| | | | |
|---|---|---|---|
| 2,129,264 | 9/1938 | Downing et al. | 260/501.13 |
| 3,219,114 | 11/1965 | Oxford | 166/275 |
| 3,280,179 | 10/1966 | Ernst | 260/501.12 |
| 3,349,032 | 10/1967 | Krieg | 252/8.55 |
| 3,469,630 | 9/1969 | Hurd et al. | 166/273 X |
| 3,660,470 | 5/1972 | Hirst | 260/501.12 |
| 3,939,911 | 2/1976 | Maddox et al. | 166/274 |
| 3,977,471 | 8/1976 | Gale et al. | 252/8.55 X |
| 4,008,768 | 2/1977 | Birk | 252/8.55 X |
| 4,076,743 | 2/1978 | Koch et al. | 252/8.55 X |

OTHER PUBLICATIONS

Parris et al., Article in *Journal of the Oil Chemists Society*, vol. 50, 9-12-73, pp. 509-512.

*Primary Examiner*—Herbert B. Guynn
*Attorney, Agent, or Firm*—C. A. Huggett; William D. Jackson

[57] ABSTRACT

Process for the recovery of oil from a subterranean oil reservoir involving the injection into the reservoir of an aqueous solution of an amphoteric surfactant having an inner quaternary ammonium group linked to a terminal sulfonate or carboxylate group. The amphoteric surfactants may be employed in relatively low concentrations within the range of 0.0005 to 0.1 weight percent and injected in a slug of at least 0.5 pore volume. The invention may be applied in situations in which the reservoir waters and/or the waters employed in formulating the surfactant solution contain relatively high amounts of divalent metal ions. Specifically disclosed amphoteric surfactants include hydrocarbyl dialkyl or dihydroxyalkyl ammonium alkane sulfonates and carboxylates in which the hydrocarbyl group contains from 8 to 26 carbon atoms.

29 Claims, 1 Drawing Figure

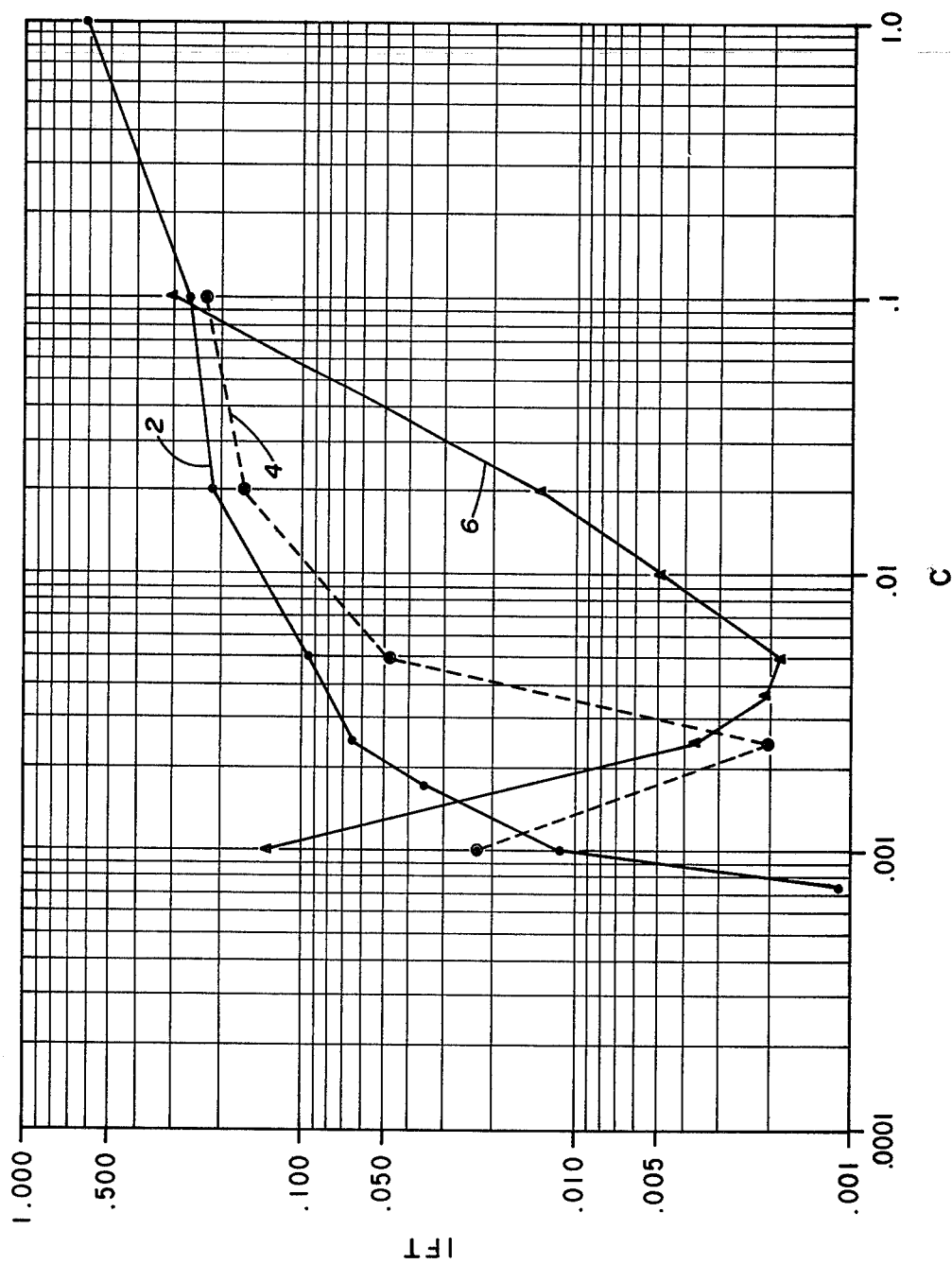

WATERFLOODING EMPLOYING AMPHOTERIC SURFACTANTS

BACKGROUND OF THE INVENTION

This invention relates to the recovery of oil from subterranean oil reservoirs and more particularly to improved waterflooding operations involving the use of certain amphoteric surfactants which are suitable for use in brines containing relatively high concentrations of divalent metal ions.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions are commonly referred to as surfactant waterflooding or as low tension waterflooding, the latter term having reference to the mechanism involving the reduction of the oil-water interfacial tension. Thus far, many such waterflooding applications have employed anionic surfactants. For example, a paper by W. R. Foster entitled "A Low-Tension Waterflooding Process", Journal of Petroleum Technology, Vol. 25, Feb. 1973, pp. 205-210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One problem encountered in waterflooding with certain of the anionic surfactants such as the petroleum sulfonates is the lack of stability of these surfactants in so-called "high brine" environments. These surfactants tend to precipitate from solution in the presence of monovalent salts such as sodium chloride in concentrations in excess of about 2-3 weight percent and in the presence of much lower concentrations of divalent metal ions such as calcium and magnesium ions. Typically, divalent metal ion concentrations of about 50-100 ppm and above tend to cause precipitation of the petroleum sulfonates. The salinity of the surfactant slug is also significant with regard to interfacial tensions achieved through the use of petroleum sulfonates such as disclosed in the Foster paper. Even in the absence of divalent metal ions, optimum interfacial tensions are seldom achieved at salinities significantly in excess of 2-3 weight percent.

Various surfactant formulations which will tolerate high salinities and/or high divalent metal concentrations have been proposed for use in high brine environments. Thus, U.S. Pat. No. 3,939,911 to Maddox et al. discloses a surfactant waterflooding process employing a three-component surfactant system which tolerates polyvalent ion concentrations from about 200 to about 14,000 parts per million. The three-component surfactant system includes an alkyl or alkylaryl sulfonate such as an ammonium dodecyl benzene sulfonate, a phosphate ester sulfonate, and a sulfonated betaine such as a $C_{12}$–$C_{24}$ alkyl amido $C_1$–$C_5$ alkane dimethylammonium propane sulfonate. The several surfactant components may be employed in concentrations from about 0.05% to about 5.0% and preferably about 0.2% to about 0.5% by weight. The surfactant system is said to be stable up to at least 225° F. and be resistant to bacterial attack and inhibits scale formation.

Another surfactant waterflooding process for use in high brine environments is disclosed in U.S. Pat. No. 4,008,768 to Birk. This patent discloses an anionic-nonionic surfactant system suitable for use in aqueous environments exhibiting salinities within the range of 3–25 weight percent and containing divalent metal ions in amounts as high as 3 weight percent. A multicomponent surfactant system disclosed for use in the Birk process comprises an amide-linked sulfonate such as a di-substituted taurate containing a $C_{12}$–$C_{20}$ aliphatic group and a nonionic surfactant such as a polyethoxylated alkyl phenol or a polyethoxylated aliphatic alcohol.

Another oil recovery process involving the injection of surfactant-containing water into an oil reservoir having a "downstructure" in order to recover "cellar oil" is disclosed in U.S. Pat. No. 3,219,114 to Oxford. In this procedure, salt water having a specific gravity in excess of 1.05 and containing a benzyl chloride quaternary compound of coco amido amine, either alone or in combination with a second surfactant prepared by reacting ethylene oxide with a primary amine, is injected into the well. The well is then shut-in and oil subsequently produced through the same and if desirable other wells. The surfactants are employed in concentrations of at least 2 ppm and more beneficially in concentrations within the range of 20 to 500 ppm.

U.S. Pat. No. 3,349,032 to Krieg discloses the use of certain polyquaternary amines in waterflooding which function to reduce clay swelling and clay blocking within the formation. Examples of such polyquaternary compounds include bis-quaternaries linked through hydrocarbyl groups or ether-, ester-, or amido-containing groups and with negative ions provided by chlorine, bromine, iodine, sulfate, sulfonate, etc. The polyquaternary compounds are employed in concentrations ranging from 5 ppm up to about 10,000 ppm and preferably about 100 to 300 ppm.

SUMMARY OF THE INVENTION

In accordance with the present invention, there is provided a new and improved surfactant waterflooding process employing an amphoteric surfactant which is effective in reducing oil-water interfacial tensions in relatively saline aqueous media which include the presence of significant quantities of divalent metal ions. The invention is carried out in a subterranean oil reservoir penetrated by spaced injection and production system. In carrying out the invention, at least a portion of the injected fluid comprises an aqueous liquid containing an amphoteric surfactant characterized by the formula:

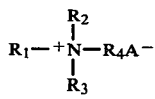

wherein:
- $R_1$ is a hydrocarbyl group containing from 8 to 26 carbon atoms,
- $R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3,
- $R_4$ is an aliphatic group containing from 1 to 6 carbon atoms, and
- A is a sulfonate group or a carboxylate group. A preferred application of the present invention is in oil reservoirs in which the formation waters exhibit high salinities and/or divalent metal ion concentrations or in instances in which the available injection waters exhibit high salinities and/or divalent metal ion concentrations. Thus a preferred application is in cases where the formation waters or the injection waters, or both, contain divalent metal ions in concentrations of at least 0.1 weight percent.

In a preferred embodiment of the invention, the injected aqueous liquid contains the amphoteric surfactant in a relatively low concentration within the range of 0.001 to 0.1 weight percent and is injected in a relatively large pore volume amount of at least 0.5 pore volume.

In one aspect of the invention, the amphoteric surfactant employed is a hydrocarbyl dimethylammonium propane sulfonate characterized by the formula:

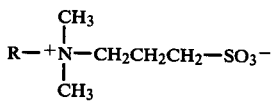

wherein R is a hydrocarbyl group containing from 10 to 26 carbon atoms.

In yet a further embodiment of the invention, the amphoteric surfactant is a hydrocarbyl dihydroxyethylammonium propane sulfonate characterized by the formula:

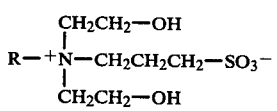

wherein R is a hydrocarbyl group containing from 10 to 26 carbon atoms.

BRIEF DESCRIPTION OF THE DRAWING

The drawing is a graph illustrating the interfacial tensions achieved between an oil and brine solutions of amphoteric surfactants employed in the present invention.

DESCRIPTION OF SPECIFIC EMBODIMENTS

The present invention involves a process for the recovery of oil employing an amphoteric surfactant having an inner quaternary ammonium group which is linked to a terminal sulfonate group or carboxylate group. The electrical charge on the inner quaternary group is electrically balanced by the terminal anionic group and such amphoteric surfactants may thus be characterized as dipolar ions or zwitter ions.

The lipophilic base of the surfactant is linked to the terminal anionic group through the quaternary ammonium group and is provided by one or more hydrocarbyl groups. More specifically, the lipophilic base of the surfactant molecule may be provided by one or more aliphatic groups or aliphatic-substituted aryl groups. Where an aliphatic-substituted aryl group is employed in providing the lipophilic base, the aryl component may be a mononuclear group or a condensed ring dinuclear group, e.g. benzene or naphthalene, and contains one or more aliphatic substituents. Preferably, the aryl component is mononuclear in view of the practical considerations of economy and product synthesis and is substituted with a $C_8$–$C_{18}$ aliphatic group. Where the aryl component is dinuclear, it is substituted with a $C_6$–$C_{16}$ aliphatic group, thus providing a total of from 16 to 26 carbon atoms.

The lipophilic base of the amphoteric surfactant may be conjugated in nature as in the case of the trioctylammonium and bisdecylmethylammonium derivatives described hereinafter or it may be primarily monobasic as in the case of the octadecyldimethylammonium bis(ethoxy)ammonium derivative as described hereinafter. In the latter case, the lipophilic basis may be provided by an aliphatic-substituted aryl group as described previously or by a $C_{10}$–$C_{20}$ aliphatic group. In the case of the conjugated derivative, the lipophilic base may be provided by two or three aliphatic groups containing in combination a total number of from 12 to 24 carbon atoms with at least one of the aliphatic groups containing 8 or more carbon atoms. The aliphatic groups or aliphatic substituents employed in formulating the lipophilic base may be unsaturated and/or can contain branched chains but usually will take the form of normal alkyl or alkynyl radicals.

Amphoteric surfactants of the general type employed in carrying out the present invention are known in the detergent art and have been proposed for various uses such as liquid or solid soap additives, shampoo additives, lime soap dispersants, scale inhibitors, and bactericides. For descriptions of such compounds and their methods of preparation, reference is made to Parris, N. et al., "Soap Based Detergent Formulations. V. Amphoteric Lime Soap Dispersing Agents", Journal of the Americal Oil Chemists' Society, Vol. 50, pp. 509–512 (1973), U.S. Pat. No. 3,280,179 to Ernst, and U.S. Pat. No. 3,660,470 to Hirst.

A class of amphoteric surfactants suitable for use in carrying out the invention may be characterized by the formula:

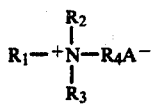

wherein:
R$_1$ is a hydrocarbyl group containing from 8 to 26 carbon atoms,
R$_2$ and R$_3$ are each independently a hydrocarbyl group containing from 1 to 8 carbon atoms or an alkoxy group containing from 2 to 10 carbon atoms and having a ratio of carbon atoms to oxygen atoms within the range of 2 to 3,
R$_4$ is an aliphatic group containing from 1 to 6 carbon atoms, and
A is a sulfonate group or a carboxylate group. The number of carbon atoms in the group R$_1$ may vary as indicated by formula (1) between 8 to 26, depending upon the nature of the group and also the groups R$_2$ and R$_3$. Where R$_1$ is an aliphatic group, it will normally contain from 10 to 20 carbon atoms except in the case where R$_2$ and R$_3$ are each C$_8$ aliphatic groups, in which case R$_1$ may also be a C$_8$ aliphatic group. Where R$_1$ is an aliphatic-substituted aryl group, it normally will contain from 6 to 18 aliphatic carbon atoms and more specifically 8 to 18 aliphatic carbon atoms in the case of the mononuclear aryl derivative and 6 to 16 aliphatic carbon atoms in the case of the condensed ring dinuclear derivative.

The groups R$_2$ and R$_3$ may be the same or different and are selected from the group consisting of C$_1$–C$_8$ hydrocarbyl groups or C$_2$–C$_{10}$ alkoxy groups having a ratio of carbon atoms to oxygen atoms within the range of 2 to 3. Stated otherwise, where R$_2$ or R$_3$ is an alkoxy group, it may be ethylene oxide, polyethylene oxide containing up to 5 ethylene oxide units, propylene oxide, polypropylene oxide containing up to 3 propylene oxide units, or oligmers of mixtures of ethylene oxide and propylene oxide containing no more than 10 carbon atoms. The nature of the R$_2$ and R$_3$ groups are, as noted previously, somewhat dependent upon the nature of the R$_1$ group. Where R$_1$ comprises a relatively long chain aliphatic substitutent, R$_2$ and R$_3$ normally will be relatively short chain hydrocarbyl groups or ethylene oxide derivatives. For example, where R$_1$ is a C$_{14}$–C$_{18}$ aliphatic radical, R$_2$ and R$_3$ normally will be methyl or ethyl groups or groups comprising ethylene oxide, propylene oxide, or polyethylene oxides. Where R$_1$ is a lower molecular weight group and thus imparts less oil solubility to the molecule, R$_1$ and/or R$_2$ may be somewhat more oil soluble to approach a molecular configuration in which the lipophilic base is conjugated in nature. The conjugated derivative may be characterized more specifically by the formula:

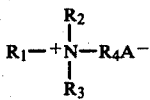

wherein:
R$_1$, R$_2$, and R$_3$ are aliphatic hydrocarbyl groups containing in combination a total number of carbon atoms within the range of 17 to 24 and at least two of R$_1$, R$_2$, and R$_3$ containing at least 8 carbon atoms,
R$_4$ is an aliphatic group containing from 1 to 6 carbon atoms, and
A is a sulfonate group or a carboxylate group.

In this case, at least two of the aliphatic groups are of sufficient chain length to impart oil solubility to the molecule. The remaining aliphatic group may be of short chain links such as in the case of a methyl or ethyl group or it may contain up to 8 carbon atoms and thus contribute to the lipophilic base. Examples of amphoteric surfactants which may be employed in carrying out the present invention having a conjugated lipophilic base include trioctylammonium propane sulfonate and bis(decyl)methylammonium propane sulfonate.

As understood by those skilled in the art, surfactant molecules are characterized by an oil-soluble portion of the molecule which tends to partition into the oil phase of an oil-water interface and a water-soluble portion which tends to partition into the water phase. In the amphoteric surfactants employed in the present invention, the sulfonate or carboxylate group is of course water soluble. In addition, the ammonium quaternary group tends to impart water solubility to the surfactant molecule to a degree depending upon the characteristics of the substituents, R$_2$ and R$_3$, described previously. The greatest water solubility is observed when the R$_2$ and R$_3$ are methyl or ethyl radicals or ethylene oxide derivatives and amphoteric surfactants of this molecular configuration are preferred in carrying out the invention.

The aliphatic linkage, R$_4$, between the quaternary ammonium and the sulfonate or carboxylate groups contains 1 to 6 carbon atoms and, in the case of R$_4$ containing 2 or more carbon atoms, may be saturated or unsaturated and straight or branched chained. The R$_4$ radical may also be substituted with a group such as a hydroxy group which tends to increase the water solubility of this portion of the surfactant molecule. Usually, however, the R$_4$ group will be unsubstituted hydrocarbyl radical. In a preferred embodiment of the invention, R$_4$ is an aliphatic group containing from 1 to 4 carbon atoms.

The preferred amphoteric surfactants for use in the present invention are the sulfonate derivatives as characterized by formulas (1) or (2) in which A$^-$ is SO$^-_3$. They may be prepared by any suitable technique such as by the reaction of a tertiary amine with a sultone as disclosed in the aforementioned article by Parris et al. and patents by Ernst and Hirst. An alternative synthesis procedure involves the reaction of a tertiary amine with a halogenated alkane sulfonate such as chloroethane sulfonate as disclosed in the patent to Hirst.

The following example illustrates the preparation of hydrocarbyl dimethylammonium propane sulfonates characterized by the formula:

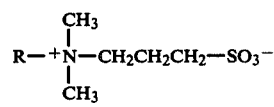

wherein R is a hydrocarbyl group containing from 10 to 26 carbon atoms.

EXAMPLE 1

In the preparation of tetradecyldimethylammonium propane sulfonate, 6.2 grams of propane sultone were added to a mole equivalent (12.2 grams) of N,N-dimethyltetradecylamine under conditions of moderate heat (70° C.). Tetradecyldimethylammonium propane sulfonate was recovered in an amount of 18.3 grams. This surfactant is designated as surfactant S-1.

A synthesis procedure similar to that described immediately above was employed to produce cetyl dimethylammonium propane sulfonate and octadecyldimethylammonium propane sulfonate designated, respectively, as surfactants S-2 and S-3.

The following example illustrates the preparation of hydrocarbyl dihydroxyethylammoniopropane sulfonates characterized by the following formula:

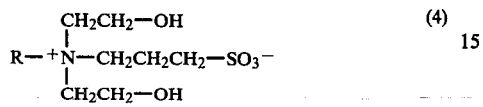

wherein R is a hydrocarbyl group containing from 10 to 26 carbon atoms.

EXAMPLE 2

In the preparation of coconut oil dihydroxyethylammonium propane sulfonate, propane sultone was reacted with N,N-dihydroxyethyl coconut oil amine under the conditions described in Example 1. The resulting coconut dihydroxyethylammonium propane sulfonate contained a distribution of aliphatic groups ranging from $C_8$ to $C_{18}$ with an average value of $R_1$ as defined in formula (4) of about 13. This surfactant is designated herein as surfactant S-4.

In a further example of the preparation of an amphoteric surfactant of the type characterized by formula (4), N,N-dihydroxyethyl octadecylamine was reacted with propane sultone in accordance with the procedure described in Example 1 to produce octadecyl dihydroxyethylammonium propane sulfonate designated herein as surfactant S-5.

The following example illustrates the preparation of a third class of preferred amphoteric surfactants which are polyethylene oxide derivatives. This class of surfactants is characterized by the formula:

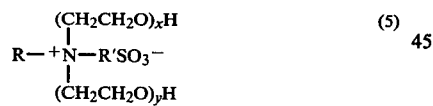

wherein:
R is a hydrocarbyl group containing from 10 to 26 carbon atoms,
x and y are at least 1 and the sum of x and y is within the range of 3 to 10, and
R' is an aliphatic group containing from 1 to 6 carbon atoms.

EXAMPLE 3

In the preparation of octadecyl bis(polyethyoxy)ammonium propane sulfonate containing a total of 5 moles of ethylene oxide, propane sultone was reacted with a tertiary amine produced by the condensation of ethylene oxide with octadecylamine and available from the Armak Company under the trade names "Ethomeen 18/15". The reaction was carried out under the conditions described in Example 1, using 4.9 grams Ethomeen 18/15 and 1.2 grams propane sultone, and yielding 6 grams of the desired surfactant. The resulting octadecyl bis(polyethyoxy)ammonium propane sulfonate characterized by formula (5) in which the sum of x and y is 5 is designated herein as surfactant S-6. A similar reaction route was employed to produce tallow bis(polyethyoxy)ammonium propane sulfonate designated herein as surfactant S-7. The tallow derivative contains a distribution of hydrocarbyl groups ranging from $C_{14}$–$C_{18}$ aliphatic groups with an average hydrocarbon chain link of about 17.

As noted previously, amphoteric sulfonates as characterized by formulas (1) and (2) may be prepared by reaction of a tertiary amine with a halogenated alkane sulfonate such as chloromethane sulfonic acid or chloroethane sulfone acid. An alternative and novel procedure for the preparation of the quaternary ammonium methane sulfonates of the type characterized by formulas (1) and (2) involves the reaction of the appropriate tertiary amine with aqueous formaldehyde and sulfur dioxide:

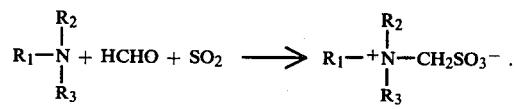

This reaction is readily carried out by treating a mixture of the tertiary amine and formaldehyde with gaseous sulfur dioxide. The formaldehyde and amine may be dissolved in any suitable solvent such as ethanol, methanol, or isopropyl alcohol. The following example illustrates the preparation of a quaternary ammonium methane sulfonate in accordance with reaction (1).

EXAMPLE 4

In the preparation of coconut oil dihydroxyethylammonium methane sulfonate, 14 grams of N,N-dihydroxyethyl coconut amine (available from the Armak Company under the trade name "Ethomeen C/12") and 6 grams of 37% aqueous formaldehyde were dissolved in 200 cc of absolute ethanol. Gaseous sulfur dioxide was then bubbled through the alcohol solution of tertiary amine and formaldehyde for 30 minutes. The reaction was initiated at room temperature and was found to be slightly exothermic. At the conclusion of the sulfur dioxide treatment, the solvent was then evaporated off to yield 18.5 grams of coconut oil dihydroxyethylammonium methane sulfonate designated herein as surfactant S-8.

The carboxylate derivatives characterized by formula (1) or (2) in which $A^-$ is $COO^-$ may be prepared by quaternizing a tertiary amine with a chlorinated ester to form a cationic quaternary ammonium salt and then hydrolyzing the ester constituent to form the amphoteric carboxylate. The following example illustrates the preparation of hydrocarbyl dimethylammonium methane carboxylates characterized by the formula:

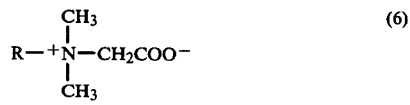

wherein R is a hydrocarbyl group containing from 8 to 26 carbon atoms.

EXAMPLE 5

In the preparation of coconut oil dimethylammonium methane carboxylate, molar equivalents amounts of ethyl chloroacetate and N,N-dimethyl coconut oil amine were mixed together and heated at a temperature of about 100° C. The resulting quaternary ammonium chloride was then mixed with an aqueous solution of sodium hydroxide in order to hydrolyze the ester to produce the amphoteric carboxylate in accordance with the following reaction:

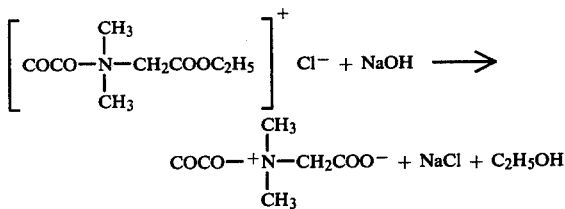

The coconut oil dimethylammonium methane carboxylate produced in accordance with this procedure is designated herein as surfactant S-9. An aqueous solution containing surfactant S-9 in a concentration of about 16 weight percent was mixed with an equal volume of a mixed brine exhibiting a total salinity of 30% including about 35,000 ppm of calcium and magnesium ions. The resulting 8% surfactant solution in the mixed brine having a salinity of about 15 weight percent showed no evidence of precipitation.

Procedures analogous to those described in the above examples can be employed in preparing other amphoteric quaternary ammonium sulfonates or carboxylates for use in the present invention. For example, a quaternary ammonium butane sulfonate may be prepared by reaction of butane sultone with the appropriate tertiary amine. Similarly, amphoteric quaternary ammonium sulfonates in which $R_4$ is a branched chain may be prepared by this reaction route such as by reacting 3-methyl propane sultone or 4-methyl butane sultone with the appropriate tertiary amine. Procedures analogous to those employed in Example 5 can be used to prepare various other quaternary ammonium carboxylates by selection of the appropriate chlorinated ester. Thus, amphoteric carboxylate surfactants of the type characterized by formulas (1) and (2) in which $R_4$ is an ethane group may be prepared by reacting the appropriate tertiary amine with ethyl chloropropionate with subsequent hydrolysis of the resulting quaternary ammonium chloride. Amphoteric surfactants of the type characterized by formulas (1) and (2) in which $R_4$ is the substituted aliphatic radical may also be prepared by quaternization of a tertiary amine with chlorinated epoxide to produce a cationic quaternary ammonium salt and conversion of the salt to the corresponding amphoteric surfactant. For example, octadecyldimethylammonium hydroxypropane sulfonate may be prepared by the reaction of epichlorohydrin with N,N-dimethyl octadecylamine to form the cationic quaternary ammonium chloride. This salt is then reacted with sodium sulfite to form octadecyldimethylammonium 2-hydroxypropane sulfonate.

The effect of aqueous phase salinity (total dissolved salts content) and divalent metal ion concentration on the amphoteric surfactant employed in the present invention is illustrated by interfacial tension measurements taken for different surfactant concentrations in various brine solutions. Three different brine solutions were used in the experimental work. Brine A contained 9.65 weight percent sodium chloride, 3.85 weight percent calcium chloride, and 1.5 weight percent magnesium chloride to provide a total salinity of 15 weight percent and a total divalent metal ion concentration (magnesium and calcium ions) of 17,733 ppm. Brine B had a somewhat higher total salinity of 19.3 weight percent but a lower divalent metal ion concentration of 11,275 ppm. This brine contained 16.0 weight percent sodium chloride and 9,450 ppm calcium ions and 1,825 ppm magnesium ions both as the chloride salts. Brine C had a total salinity of 6.6 weight percent and contained 6.2 percent sodium chloride and 250 ppm magnesium ions, 1,160 ppm calcium ions, and 90 ppm barium ions, again all as chlorides. The oil phase employed in this experimental work was a South Texas crude oil. In each case the interfacial tension measurements were taken by the spinning drop procedure. The aqueous surfactant solutions employed in the experimental work were aged for periods ranging from 10 minutes to 3 months before the interfacial tension measurements were taken and in each case showed no evidence of precipitating in the presence of the divalent metal ions.

The results of these interfacial tension experiments for the previously identified surfactants S-1 through S-6 and S-8 are set forth in Table I. In Table I the first and second columns indicate, respectively, the surfactant and surfactant concentration in weight percent. The third column indicates by the previously identified code letters, the brine employed to form the aqueous phase and the fourth column sets forth the interfacial tensions observed in dynes/cm.

TABLE I

| Surf. | Conc. | Brine | IFT |
|---|---|---|---|
| S-1 | 1 | A | .283 |
|  | 2.5 | C | .75 |
| S-2 | 1.0 | B | .626 |
|  | .1 | B | .263 |
|  | .1 | A | .086 |
|  | .1 | C | .23 |
|  | .02 | B | .215 |
|  | .02 | A | .084 |
|  | .02 | C | .165 |
|  | .005 | B | .094 |
|  | .005 | C | .039 |
|  | .0025 | B | .064 |
|  | .0025 | C | .002 |
|  | .00175 | B | .036 |
|  | .001 | B | .011 |
|  | .001 | C | .023 |
|  | .00075 | B | .00115 |
|  | .0005 | B | .0015 |
| S-3 | 2.5 | B | .152 |
|  | .1 | B | .128 |
|  | .02 | A | .030 |
|  | .02 | B | .013 |
|  | .01 | B | .005 |
|  | .005 | B | .0019 |
|  | .0035 | B | .0021 |
|  | .0025 | B | .0037 |
|  | .001 | B | .138 |
| S-4 | .1 | A | .356 |
| S-5 | .02 | A | .0054 |
| S-6 | .02 | A | .120 |
| S-8 | .1 | B | .522 |
|  | .01 | B | .020 |
|  | .005 | B | .048 |
| S-9 | .004 | C | .056 |
|  | .002 | C | .00021 |

The data presented in Table I is somewhat characteristic in indicating interfacial tension minima as a function of surfactant concentration. It also shows that low interfacial tensions are achieved at extremely low surfactant concentrations even in the presence of high salinities up to 19.3 weight percent and high divalent metal ion concentrations up to 1.8 weight percent. The relationship between concentration and interfacial tensions can be seen from an examination of the drawing which presents certain of the data presented in Table I for surfactants S-2 and S-3. In the drawing, the log of interfacial tension, IFT, in dyne/cm is plotted on the ordinate versus the log of surfactant concentration, C, in weight percent on the abscissa. Curves 2 and 4 in the drawing are graphs of the interfacial tension measurements observed for the surfactant S-2 in brines B and C, respectively, and curve 6 is a graph showing the interfacial tension data for the surfactant S-3 in brine B. As can be seen from an examination of curves 2, 4, and 6, interfacial tensions in the millidyne region were observed for surfactant concentrations of less than 0.01 weight percent. In fact for the surfactant S-2 in the 19.3 percent brine, a surfactant concentration of 0.00075 weight percent (7.5 ppm) resulted in an interfacial tension of about 1 millidyne/cm.

An important consideration in the use of chemical additives in waterflooding is the stability of the chemicals to degradation at the elevated temperatures normally encountered in subterranean oil reservoirs. An indication of the stability of the amphoteric surfactants employed in the present invention may be gained from an experiment carried out with the surfactant S-2. A 2.0 weight percent solution of surfactant S-2 in brine B was refluxed for a period of one month with no apparent decrease in surfactant concentration. This may be contrasted with a similar experiment carried out employing a coconut oil amido propane dimethylammonium hydroxypropane sulfonate available from the Miranol Chemical Company under the trade name "Mirataine CBS". A 2.0 weight percent solution of Mirataine CBS in brine B was refluxed for a period of 5 days. At the conclusion of this period, an examination showed that the surfactant concentration had decreased by more than half to a value of about three-fourths of a percent.

In further experimental work relative to the invention, laboratory displacement tests were carried out employing the surfactant previously identified as surfactant S-2. These laboratory tests involved linear displacement runs performed in 3-foot long glass tubes having an inside diameter of 11/32 inch and packed with unconsolidated Berea sand. In each tube run, the sand packed tube was saturated with brine and then flooded with crude oil until the effluent from the tube contained no water in order to arrive at an initial oil saturation. The crude oil employed in each test was the South Texas crude described previously. The tube was then subjected to a simulated conventional waterflood by the injection of the same brine as employed in the initial tube saturation until no further oil was displaced in order to arrive at a waterflood residual oil saturation. Thereafter, the tube was subjected to a surfactant flood which involved the injection of a brine solution of the surfactant S-2 followed by the injection of a mobility control slug. The mobility control slug comprised a brine solution of 1,000 ppm of a Xanthomonas polysaccharide available from the Kelco Chemical Company under the trade name "Kelzan". The test was then carried to conclusion by injection of brine until no further oil was recovered in order to arrive at the tertiary residual oil saturation.

The results of these displacement tests are set forth in Table II. In Table II, the second column indicates the temperature at which the run was conducted. The third column indicates by the code letters previously described the brine employed for initial water saturation and for oil displacement including the simulated waterflood, the surfactant slug, the mobility control slug, and the driving fluid. The fourth and fifth columns indicate the concentration of surfactant employed and the pore volume amount of surfactant slug injected, respectively, and the sixth column indicates the tertiary oil recovered as a percent of the waterflood residual oil. In Run 2, the normal tertiary injection format was departed from by injecting a 2.5 weight percent surfactant solution continuously throughout the tube run without the injection of a mobility control slug followed by a driving fluid.

TABLE II

| Run No. | Temp. °C. | Brine | Surf. Conc., % | PV | Rec. % |
|---|---|---|---|---|---|
| 1 | 77 | C | 2.5 | .2 | 76.5 |
| 2 | 77 | C | 2.5 | cont. | 47.3 |
| 3 | 32 | B | 2.5 | .2 | 38.5 |
| 4 | 77 | C | 2.5 | .2 | 77.6 |
| 5 | 77 | C | 2.5 | .3 | 45 |
| 6 | 25 | C | 2.5 | .2 | 70.4 |
| 7 | 25 | C | 1.5 | .2 | 43.2 |
| 8 | 25 | C | 1.5 | .2 | 33.08 |
| 9 | 25 | C | 0.5 | .2 | 40.1 |
| 10 | 25 | C | 0.5 | .2 | 61.1 |
| 11 | 25 | C | 0.1 | .2 | 35.5 |
| 12 | 25 | C | 0.1 | .2 | 53.4 |

From an examination of the data presented in Table II, it can be seen that the use of the amphoteric surfactant resulted in significant tertiary oil recovery throughout the concentration ranges tested. While the data are scattered, it is evident that the high surfactant concentration of 2.5 weight percent was effective in displacing waterflood residual oil notwithstanding the interfacial tensions associated with these concentrations. From a comparison of Runs 6 through 12, it can be seen that the tertiary oil recoveries trended lower as the surfactant concentration was reduced. However, it will be recalled that the pore volume amount in each case was the same and thus the lower surfactant concentrations were much more efficient in oil displacement in terms of the amounts of surfactant utilized.

In another set of experiments, static adsorption experiments were carried out in order to determine the potential for surfactant utilization through adsorption for the amphoteric surfactants employed in the present invention. In each of these experiments, 10 milliliters of surfactant solution and 2 grams of Berea sand were placed in a container which was then agitated for 18 hours. At the conclusion of the agitation, the container was centrifuged and the supernatant surfactant solutions analyzed for the amount of surfactant remaining in solution. The final surfactant concentration was then subtracted from the initial surfactant concentration to arrive at the amount of surfactant adsorbed in milligrams of surfactant per gram of sand. In each case, the brine B was used in formulating the surfactant solution. The results of these adsorption experiments are set forth in Table III. In Table III the second column indicates the initial surfactant concentration in parts per million, the second column indicates the final surfactant concentration, and the fourth column indicates the amount of surfactant adsorbed in milligrams per gram. In Runs 1 through 4, the initial and final surfactant concentrations were determined by a technique involving the coulommetric determination of sulfur as an indication of surfactant concentration. Since the sulfur content of the surfactant was only about 8 percent, this technique is considered to be considerably less accurate than the analysis technique employed in Runs 5 through 10 which involved the coulommetric determination of a toluene extract of surfactant complexed by bromothymol blue.

TABLE III

| Run No. | Init. Conc. ppm | Final Conc. ppm | Ads. Loss mg/g |
|---|---|---|---|
| 1 | 10,997 | 10,871 | 0.63 |
| 2 | 1,932 | 1,919 | 0.07 |
| 3 | 1,136 | 1,111 | 0.12 |
| 4 | 656 | 581 | 0.37 |
| 5 | 911 | 865 | 0.23 |
| 6 | 182 | 128 | 0.27 |
| 7 | 91 | 43 | 0.24 |
| 8 | 45 | 7 | 0.19 |
| 9 | 18 | 0.8 | 0.086 |
| 10 | 9 | 0.4 | 0.043 |

From an examination of the data presented in Table III, it can be seen that the adsorption losses were relatively low throughout the surfactant concentration ranges tested and, considering Runs 5 through 10 as being the more accurate, were less than 0.3 mg/g for surfactant concentrations of less than 0.1 weight percent.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein is meant that volume of the portion of the formation underlying the well pattern employed, as described in greater detail in the Burdyn et al. patent.

The present invention may be carried out in conjunction with the use of a thickening agent added for mobility control purposes. The thickening agent may be added to the aqueous solution of the amphoteric surfactant or, where a relatively small surfactant slug is employed, it may be injected in a separate mobility control slug. Where a separate mobility control slug is employed, it normally will be injected immediately after the slug containing the surfactant. The thickening agent may be added in concentrations so as to provide a graded viscosity at the trailing edge of the mobility control slug as disclosed in the aforementioned paper by Foster or graded viscosities at both the leading and trailing edges of the mobility control slug as disclosed in U.S. Pat. No. 4,018,281 to Chang. Alternatively, the thickening agent concentration may be relatively constant throughout. Normally, the viscosity of at least a portion of the mobility control slug should be at least as great as that of the reservoir oil and typically it will be within the range of about 1 to 4 times the viscosity of the reservoir oil. Various thickening agents which may be employed for mobility control purposes are well known to those skilled in the art and include such polymers as Polysaccharide B-1459 available from the Kelco Company under the trade name "Kelzan" and the various partially hydrolyzed polyacrylamides available from the Dow Chemical Company under the trade name "Pusher Chemicals".

In view of the compatibility of the amphoteric surfactants used in the present invention with divalent metal ions, a preferred application of the invention is in reservoirs in which the connate water contains significant divalent ion concentrations and in situations where the available flooding medium contains divalent metal ions inconsistent with the use of conventional anionic surfactants such as petroleum sulfonates. Thus, a preferred application of the present invention is in those situations in which the reservoir waters and/or the waters employed in formulating the flooding medium exhibit a divalent metal ion concentration of at least 0.1 weight percent. The invention is particularly useful where the reservoir and/or injection waters have divalent metal ion concentrations of 0.5 weight percent or more in view of the low interfacial tensions and adsorption rates associated with low surfactant concentrations in these environments. A similar consideration applies with regard to those situations in which the reservoir waters and/or injection waters exhibit moderate to relatively high salinities even though the divalent metal ion concentration may be relatively low. Thus, another application of the invention is those situations in which the reservoir waters and/or injection waters have salinities of at least 5.0 weight percent, whether provided by monovalent salts such as sodium chloride or monovalent salts and divalent salts such as calcium or magnesium chloride.

The amphoteric surfactants may be employed in accordance with the present invention in any suitable concentration depending upon the characteristics of the particular reservoir involved and such factors as surfactant consumption, e.g. by adsorption, and dispersion of the surfactant into the reservoir water. In the displacement tests described previously, waterflood residual oil was displaced by solutions ranging in surfactant concentrations from 0.1 to 2.5 weight percent. The interfacial tension data described previously show that extremely low interfacial tensions may be achieved employing surfactant concentrations as low as 5 ppm. In view of the interfacial tensions achieved with low surfactant concentrations together with the attendant relatively low surfactant adsorption, a preferred mode of carrying out the present invention is to employ a relatively large volume of aqueous solution containing the surfactant in a relatively low concentration. More specifically, in this embodiment of the invention, the aqueous solution contains the amphoteric surfactant in a concentration within the range of 0.0005–0.1, and more preferably within the range of 0.0005–0.5 weight percent, and is injected in an amount of at least 0.5 pore volume. The surfactant solution may be the sole fluid injected in which case it will be employed in an amount, normally 1.0 to 2.0 pore volumes, as is necessary to carry the recovery project to its conclusion, or lesser amounts of surfactant solution may be employed and the recovery process carried to conclusion by a driving fluid.

In this application of the invention, a portion of the surfactant solution may contain a thickening agent for mobility control purposes as described previously. Thus, an initial portion of the surfactant solution may be injected without thickening agent and the thickening agent then added to a subsequent portion of the surfactant solution in any of the mobility control configurations described previously.

The present invention may also be carried out employing a traditional injection format in which a more concentrated surfactant solution is injected in a limited amount. Thus, a surfactant slug containing the amphoteric surfactant in an amount within the range of 0.1–2.5 weight percent may be injected in an amount within the range of 0.05–0.3 pore volume. Thereafter, a mobility control slug normally will be injected followed by a driving fluid injected in such amount as necessary to carry the process to completion.

I claim:

1. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system at least 0.5 pore volume of an aqueous liquid containing a water-soluble amphoteric surfactant characterized by the formula:

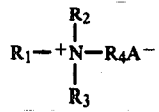

wherein:
$R_1$ is a hydrocarbyl group containing from 8 to 26 carbon atoms,
$R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3,
$R_4$ is an aliphatic group containing from 1 to 6 carbon atoms, and
A is a sulfonate group or a carboxylate group, in a concentration within the range of 0.005 to 0.05 weight percent.

2. The method of claim 1 wherein said subterranean oil reservoir contains water having a divalent metal ion concentration of at least 0.1 weight percent.

3. The method of claim 1 wherein said subterranean oil reservoir contains water having a divalent metal ion concentration of at least 0.5 weight percent.

4. The method of claim 1 wherein $R_1$ is an aliphatic group containing from 10 to 20 carbon atoms.

5. The method of claim 1 wherein $R_1$ is an aliphatic group containing from 14 to 18 carbon atoms.

6. The method of claim 5 wherein $R_4$ is an aliphatic group containing from 1 to 4 carbon atoms.

7. The method of claim 1 wherein $R_1$ is an aliphatic group containing from 16 to 18 carbon atoms.

8. The method of claim 7 wherein $R_4$ is a methane, ethane, or propane group.

9. The method of claim 1 wherein $R_1$ is an aliphatic-substituted mononuclear or condensed ring dinuclear aryl group containing from 6 to 18 aliphatic carbon atoms.

10. The method of claim 9 wherein $R_1$ is an aliphatic-substituted mononuclear aryl group containing from 10 to 18 aliphatic carbon atoms.

11. The method of claim 10 wherein $R_4$ is an aliphatic group containing from 1 to 4 carbon atoms.

12. The method of claim 11 wherein $R_2$ and $R_3$ are each independently a methyl group or an ethyl group.

13. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system at least 0.5 pore volume of an aqueous liquid containing a water-soluble amphoteric surfactant characterized by the formula:

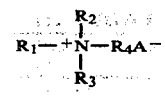

wherein:
$R_1$, $R_2$, and $R_3$ are aliphatic hydrocarbyl groups containing in combination a total number of carbon atoms within the range of 17 to 24 and at least two of $R_1$, $R_2$, and $R_3$ containing at least 8 carbon atoms,
$R_4$ is an aliphatic group containing from 1 to 6 carbon atoms, and
A is a sulfonate or carboxylate group, in a concentration within the range of 0.005 to 0.05 weight percent.

14. The method of claim 13 wherein $R_1$ contains from 14 to 20 carbon atoms and $R_2$ and $R_3$ each independently contains 1 or 2 carbon atoms.

15. The method of claim 14 wherein $R_4$ contains from 1 to 4 carbon atoms.

16. The method of claim 14 wherein $R_1$ contains from 16 to 18 carbon atoms and $R_4$ contains 3 carbon atoms.

17. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system at least 0.5 pore volume of an aqueous liquid containing a water-soluble amphoteric surfactant characterized by the formula:

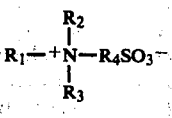

wherein:
$R_1$ is a hydrocarbyl group containing from 10 to 26 carbom atoms,
$R_2$ and $R_3$ are each independently a methyl, ethyl, or hydroxyethyl group, and
$R_4$ is an aliphatic group containing from 1 to 4 carbon atoms,
in a concentration within the range of 0.005 to 0.05 weight percent.

18. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system at least 0.5 pore volume of an aqueous liquid containing a water-soluble amphoteric surfactant characterized by the formula:

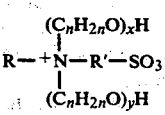

wherein:

R is a hydrocarbyl group containing from 10 to 26 carbon atoms, n is 2 or 3, x and y are at least 1 and the sum of x and y is within the range of 2 to 10, and R' is an aliphatic group containing from 1 to 6 carbon atoms, in a concentration within the range of 0.005 to 0.05 weight percent.

19. The method of claim 18 wherein R is an aliphatic group containing from 16 to 22 carbon atoms and the sum of x and y is within the range of 4 to 6.

20. The method of claim 19 wherein R' is an aliphatic group containing from 1 to 4 carbon atoms.

21. The method of claim 20 wherein R' is a methane, ethane, or propane group.

22. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system at least 0.5 pore volume of an aqueous liquid containing a water-soluble amphoteric surfactant characterized by the formula:

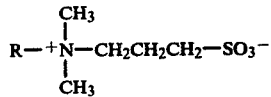

wherein R is a hydrocarbyl group containing from 10 to 26 carbon atoms, in a concentration within the range of 0.005 to 0.05 weight percent.

23. The method of claim 22 wherein R is an aliphatic group containing from 10 to 20 carbon atoms.

24. The method of claim 22 wherein R is an aliphatic group containing from 16 to 20 carbon atoms.

25. The method of claim 22 wherein said amphoteric surfactant is hexadecyl dimethylammonium propane sulfonate.

26. The method of claim 22 wherein said amphoteric surfactant is octadecyl dimethylammonium propane sulfonate.

27. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system at least 0.5 pore volume of an aqueous liquid containing a water-soluble amphoteric surfactant characterized by the formula:

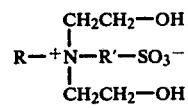

wherein:

R is a hydrocarbyl group containing from 10 to 26 carbon atoms, and

R' is an aliphatic group containing from 1 to 4 carbon atoms, in a concentration within the range of 0.005 to 0.05 weight percent.

28. The method of claim 27 wherein R is an aliphatic group containing from 12 to 20 carbon atoms.

29. The method of claim 27 wherein said amphoteric surfactant is octadecyl dihydroxyethylammonium propane sulfonate.

* * * * *